May 25, 1965   E. R. BRUUN ETAL   3,185,169
INTERCOMPARTMENT PRESSURE RATIO REGULATOR
Filed Jan. 10, 1963   2 Sheets-Sheet 1

INVENTORS
EUGENE R. BRUUN
THEODORE A. FLANDERS
MILTON MARCUS

BY Vernon F. Hauschild
ATTORNEY

United States Patent Office 3,185,169
Patented May 25, 1965

3,185,169
INTERCOMPARTMENT PRESSURE RATIO
REGULATOR
Eugene R. Bruun, Hartford, Theodore A. Flanders, Windsor, and Milton Marcus, West Hartford, Conn., assignors to United Aircraft Corporation, East Hartford, Conn., a corporation of Delaware
Filed Jan. 10, 1963, Ser. No. 250,572
6 Claims. (Cl. 137—98)

This invention relates to apparatus for regulating the pressure ratio between two fluid pressurized compartments and more particularly to the regulation of the pressure ratio between two compartments in a flight vehicle.

It is an object of this invention to teach pressure ratio regulating apparatus which regulates the pressure between two different compartments.

It is a further object of this invention to teach such apparatus which is simple in construction, durable, self-powered, and fail-safe in operation by utilizing twin valves in place of one for improved reliability.

It is an object of this invention to teach such apparatus wherein the sensor, actuator and valve are combined into the same piece.

It is still a further object of this invention to teach such apparatus wherein the pressure ratio control is obtained by the use of two moving parts, namely, the valves themselves.

It is still a further object of this invention to teach such apparatus wherein the pressure regulating valve is powered by the pressure of one of the fluids being controlled so that no separate power source is needed.

It is still a further object of this invention to teach such apparatus including the teaching of a pressure regulating valve in one of these compartments including apparatus such that the valve has a minimum area position and also has a maximum area position. Further, it is a teaching of this invention to teach a pressure ratio control in which the ratio being regulated is adjustable to different values.

It is still a further object of this invention to teach pressure ratio regulating apparatus to control the pressure ratio between two compartments in a flight vehicle wherein pressure from the first of these compartments is passed through a conduit system including an adjustable upstream orifice and a downstream orifice, which is preferably a choked venturi, to create a control pressure therebetween and further wherein this control pressure is used in conjunction with the pressure from the second of said compartments to regulate the position of a piston-type valve, whose position determines the communication between one of the compartments and a lower pressure compartment to regulate flow from the former to the latter.

Other objects and advantages will be apparent from the specification and claims and from the accompanying drawings which illustrate an embodiment of the invention.

Figure 1:
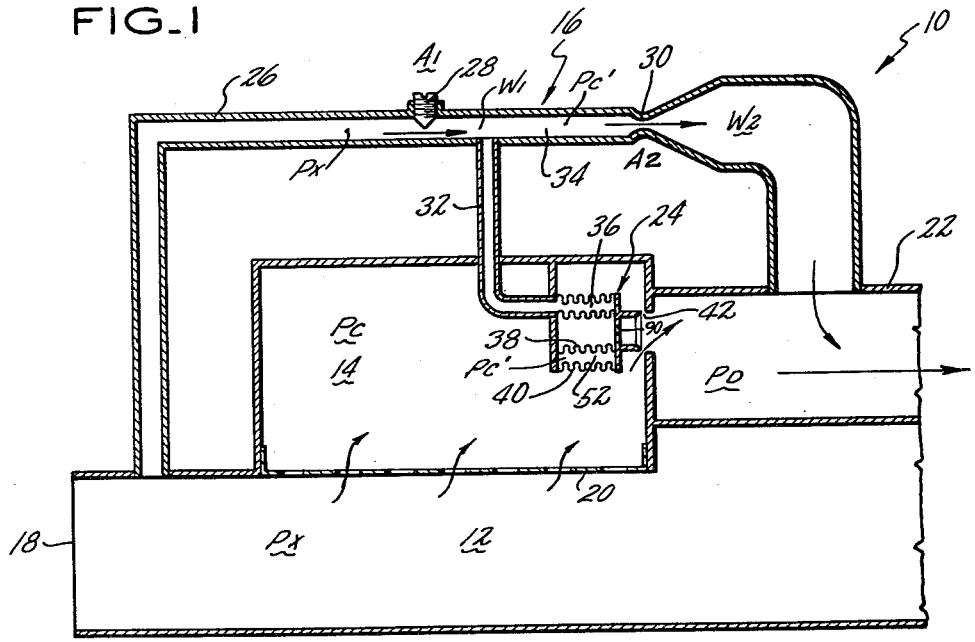
FIG. 1 is a schematic representation of the double compartment system with its pressure ratio regulating control mechanism positioned therein.

Referring to FIG. 1, we see the double compartment and control system 10 which is intended primarily for use in flight vehicles and consists of first compartment 12 and second compartment 14. Control system 16 serves the function of regulating the pressure ratio between the pressure, $P_x$ in compartment 12 and the pressure $P_c$, in compartment 14.

While not necessarily so limited, this invention could be used to regulate the area of entry flow of air being taken into the inlet of an aircraft engine wherein, as shown in FIG. 1, atmospheric air enters compartment 12 through inlet 18, then passes through perforated and variable positionable diaphragm 20 into compartment 14, from whence it flows to atmosphere or some other low pressure region through conduit 22 as regulated by the position of piston-type control or regulating valve 24. A portion of the pressure from compartment 12 at pressure $P_x$ is passed through conduit system 26 and then through the pressure ratio control mechanism 16. The fluid from chamber 12 first passes through adjustable orifice 28 which is of flow area $A_1$ and then through fixed orifice 30 which is of flow area $A_2$ and which is preferably a choked venturi so that pressure established between orifices 28 and 30, namely pressure $P_c'$, is independent of atmospheric pressure or other lower pressure changes, $P_D$, which occur downstream thereof. After passing through orifice 30, the fluid from chamber 12 then passes to atmosphere or some other low pressure region through duct 22 or a similar duct system. Conduit 32 joins region 34, which is located between orifices 28 and 30 to piston-type valve 24 so as to cause pressure from region 34 at pressure $P_c'$ to pass through conduit 32 and into the region 36 between bellows walls 38 and 40 of piston-type valve 24. It will therefore be noted that pressure at $P_c'$ is located between bellows walls 38 and 40 and provides a closing force to piston-type valve 24 in opposition to the pressure $P_c$ in compartment 14. Since pressure $P_c'$ is a function of the first compartment pressure $P_x$, it will therefore be seen that the position of valve 24 is determined by the difference in pressure between pressures $P_c$ and $P_c'$ and the valve 24 is in equilibrium when these pressures are equal since orifice 90 admits pressure $P_D$ into bellows 38, the downstream pressure $P_D$ is balanced out. Further, as pressure $P_x$ increases, pressure $P_c'$ would increase to close the outlet area 42 of valve 24, thereby causing pressure $P_c$ to rise and re-establish the desired pressure ratio, $P_x/P_c$. In like fashion, should pressure $P_x$ diminish, pressure $P_c'$ would also diminish such that pressure $P_c$ would cause valve 24 to increase area 42 and hence reduce the pressure $P_c$ to re-establish the desired pressure ratio $P_x/P_c$.

In determining what ratio we want to exist between the compartment pressure $P_x$ and $P_c$, the desired pressure ratio is selected so that this pressure ratio will have the desired effect on positioning diaphragm wall 20, for example, or generally to insure that the structure between the pressurized compartments 12 and 14 are not adversely affected by this difference in pressure between the chambers 14 and 12.

It will now be shown that the pressure ratio $P_x/P_c$ can be controlled by controlling and selecting the area of orifices 28 and 30, namely areas $A_1$ and $A_2$. Considering the flow formula through these orifices 28 and 30, $W_1$ and $W_2$, respectively, we can establish the following equations:

(1) $$w_1 = w_2$$

(2) $$\frac{P_x A_1}{\sqrt{T_0}} \sqrt{\frac{2g^K}{R^{(K-1)}} \left[\left(\frac{P_c'}{P_x}\right)^{2/K} - \left(\frac{P_c'}{P_x}\right)^{\frac{K+1}{K}}\right]} =$$

$$\frac{P_c' A_2}{\sqrt{T_0}} \sqrt{\frac{g^K}{R}\left(\frac{2}{K+1}\right)^{\frac{K+1}{K-1}}}$$

where $T_0$ = isentropic stagnation temperature of gas at $P_x$ or $P_c'$, $R$=gas constant and $g$=gravitational acceleration constant as fully explained in "The Dynamics and Thermodynamics of Compressible Fluid Flow" by Shapiro and published by Ronald.

(3)
$$P_x A_1 \sqrt{\frac{2}{K-1}\left[\left(\frac{P_o'}{P_x}\right)^{2/K} - \left(\frac{P_o'}{P_x}\right)^{\frac{K+1}{K}}\right]} = P_o' A_2 \sqrt{\left(\frac{2}{K+1}\right)^{\frac{K+1}{K-1}}}$$

(4)
$$\frac{P_x}{P_o'} \sqrt{\left(\frac{P_o'}{P_x}\right)^{2/K} - \left(\frac{P_o'}{P_x}\right)^{\frac{K+1}{K}}} = \frac{A_2}{A_1} \sqrt{\left(\frac{2}{K+1}\right)^{\frac{K+1}{K-1}}} \sqrt{\frac{K-1}{2}}$$

(5)
$$\left(\frac{P_x}{P_o'}\right)^2 \left[\left(\frac{P_o'}{P_x}\right)^{2/K} - \left(\frac{P_o'}{P_x}\right)^{\frac{K+1}{K}}\right] = \left(\frac{A_2}{A_1}\right)^2 \left[\left(\frac{2}{K+1}\right)^{\frac{K+1}{K-1}}\right]\left[\frac{K-1}{2}\right]$$

(6)
$$\left(\frac{P_o'}{P_x}\right)^{2\left(\frac{1-K}{K}\right)} - \left(\frac{P_o'}{P_x}\right)^{\frac{1-K}{K}} = \left(\frac{A_2}{A_1}\right)^2 \left[\left(\frac{2}{K+1}\right)^{\frac{K+1}{K-1}}\right]\left[\frac{K-1}{2}\right]$$

(7)
$$\frac{P_o'}{P_x} = \left[\frac{1}{\frac{1}{2} + \frac{1}{2}\sqrt{1 + 4\left[\left(\frac{2}{K+1}\right)^{\frac{K+1}{K-1}}\right]\left[\frac{K-1}{2}\right]\left[\frac{A_2}{A_1}\right]^2}}\right]^{\frac{K}{1-K}}$$

Since $K$ is essentially constant ($K=1.4$ for air), the ratio $P_c'/P_x$ is uniquely determined by the area ratio $A_2/A_1$.

Figure 3:
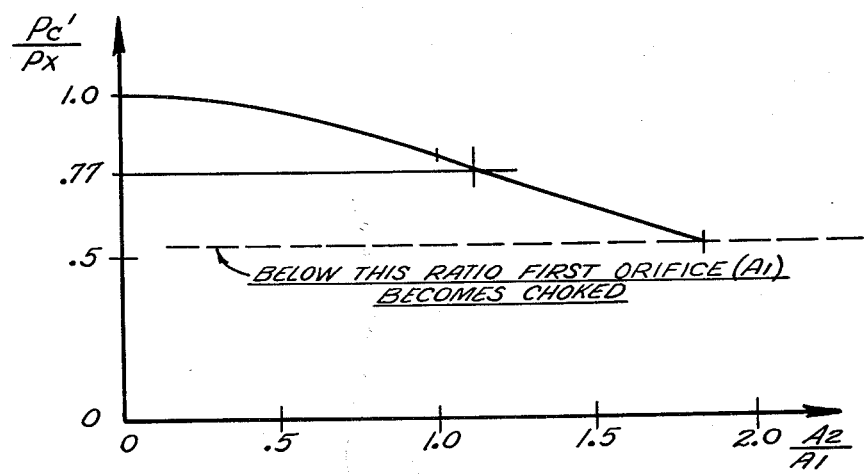
FIG. 3 is a graphic representation of the orifice area ratio plotted against the pressure ratio to illustrate the region of operation on the control.
Figure 2:
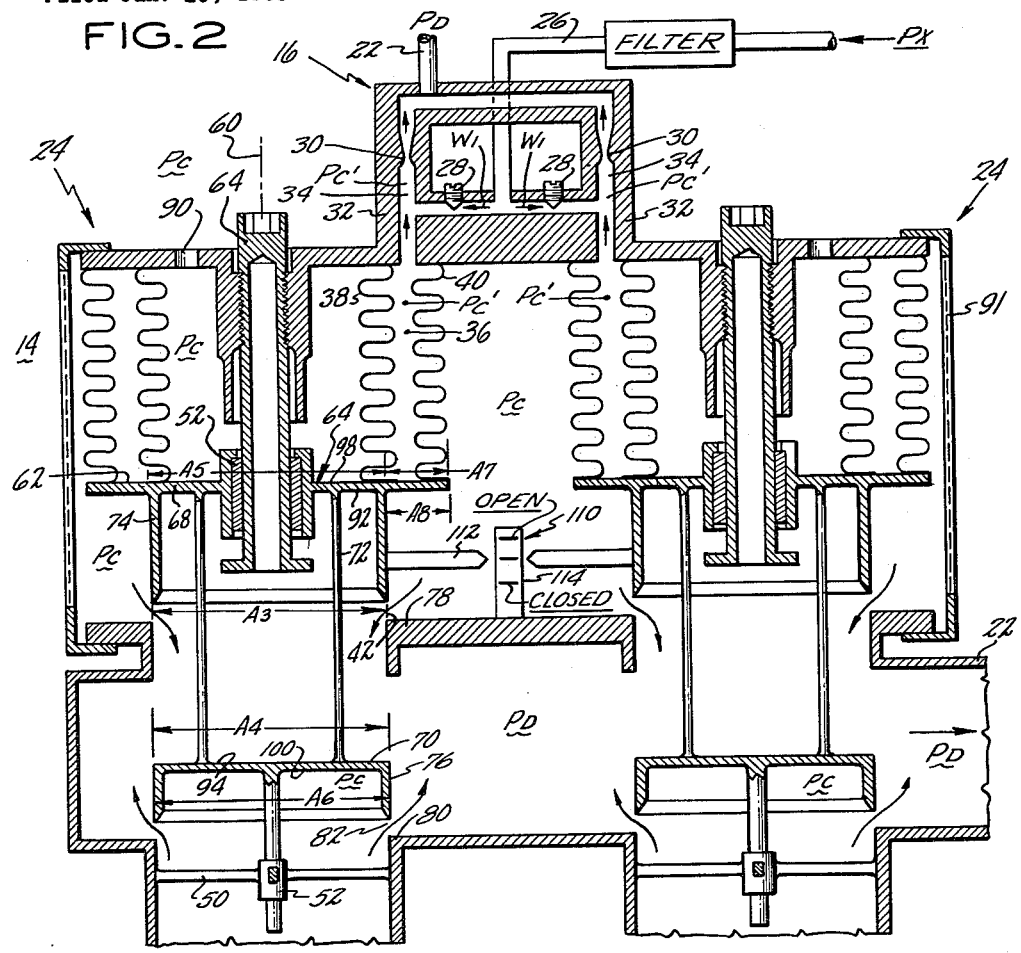
FIG. 2 is a cross-sectional showing of the bleed or pressure regulating valve.

By viewing the piston-type valve 24 shown in FIG. 2, it will be noted that when pressure $P_c'$ and pressure $P_c$ are equal, valve 24 is at equilibrium. Accordingly, for equilibrium conditions, it can be stated that the ratio $P_c/P_x$ equals the ratio $A_2/A_1$. It will be noted that the area $A_1$ of valve 28 is adjustable in any convenient fashion such as screw thread mechanism. In addition, by viewing FIG. 3, we note the graphic representation of the pressure ratio $P_c'/P_x$ plotted against the area ratio $A_2/A_1$. It will be noted that our areas $A_2$ and $A_1$ have been selected such that the pressure ratio is at an operating region of about .77.

Now referring to FIG. 2 we see the piston-like flow control valve 24 in greater particularity. It will be noted that two fully equivalent valves 24 are used. This is for the purpose of providing fail-safe pressure ratio regulation wherein either valve can fully control the pressure ratio and hence the loss of one valve 24 to the control system 16 will not adversely affect the pressure ratio control for the other valve 24 will take over the complete control function. Description will be made of the valve 24 shown in the left portion of FIG. 2, but it should be borne in mind that this description is fully applicable to the fully similar valve shown in the right portion of FIG. 2.

Valve 24 is shown to be of generally circular cross section and concentric about axis 60. Bellows walls 38 and 40 are positioned concentrically about axis 60 and forms control chamber 46 therebetween into which pressure at pressure $P_c'$ is introduced to act upon face 62 of piston-type valve 24 in a valve-closing direction. Piston assembly 64 is caused to translate by the pressures acting thereagainst along axis 60, and in particular along maximum closed valve position adjusting bar 64, to which piston unit 64 is attached through ball bushing 52. Bushinged frame 50 supports the lower end of piston unit 64. The bellows walls 38 and 40 are preferably made of Inconel X and the bellows 38 and 40 are selected to be of low spring rate.

Piston unit 64 consists of first plate mechanism 68 and second plate mechanism 70 spaced along axis 60 therefrom and positioned therefrom by bar mechanisms 72. Plates 68 and 70 carry cylindrical valve skirts 74 and 76, respectively, which coact with valve seats 78 and 80, respectively, to form the valve flow orifices 42 and 82, respectively. Accordingly, as the pressures acting upon the valve plate 68 and 70 vary, valve skirts 74 and 76 are caused to move in unison toward or away from valve seats 78 and 80 to accordingly vary the area of valve orifices 42 and 82 and therefore vary the amount of flow from compartment 14 therethrough to the lower pressure region of pressure $P_D$ such as atmosphere via conduit 22.

The areas within valve piston skirts 74 and 76 is equal and preferably about 7 square inches. Now considering the various pressures which act to open and close the piston-type valve 24, it will be noted, as previously discussed, that pressure $P_c'$ acts against surface 62 between bellows walls 38 and 40. Fluid at pressure $P_c$ is permitted to enter the area within bellows wall 38 through orifice 90 and exterior of bellows wall 40 through filter 91. It will accordingly be seen that atmospheric or other low pressure fluid at pressure $P_D$ acts across the equal areas $A_3$ and $A_4$ of surfaces 92 and 94, respectively, of plates 68 and 70, such that these pressures balance out.

In similar fashion, fluid at pressure $P_c$ from compartment 14 acts across equal areas $A_5$ and $A_6$ against surfaces 98 and 100, respectively, of plates 68 and 70 such that these pressures are also balancing. Accordingly, the only remaining areas of valve 24 are equal areas $A_7$ and $A_8$ on surfaces 62 and 92, respectively, of plate 68 and which are subjected, respectively, to pressures $P_c'$ and $P_c$.

It will therefore be obvious to those skilled in the art that because of the low spring rate of the bellows walls 38 and 40, valve 24 is in equilibrium and hence stationary when pressures $P_c'$ and $P_c$ are equal since all other pressures acting against valve 24 are acting against selected areas so as to be cancelling forces. In view of this, it will therefore be realized that the pressure ratio $P_x/P_c$, that is, the ratio of the pressures existing in compartments 12 and 14, are at the desired ratio when pressure $P_c'$ equals pressure $P_c$ and that any variation in either pressure $P_c$ or $P_x$ will cause the valve to move to re-establish the desired pressure ratio, as determined by the ratio of the orifices areas $A_2/A_1$.

As best shown in FIG. 2, valve position indicator 110 is located so as to be visually observable and consists of valve position pointer 112 and valve position location indicating panel 114, with which pointer 112 registers to indicate the position of valve 24.

It is to be understood that the invention is not limited to the specific embodiment herein illustrated and described but may be used in other ways without departure from its spirit as defined by the following claims. We claim:

1. In a flight vehicle having first and second compartments with a first and second pressure therein respectively, means to control the ratio between said first and second pressures comprising valve means located in second compartment and controlling communication between said second compartment and a lower pressure and subjected over a selected area on one side to said second pressure, valve position control means defining a control pressure chamber on the opposite side of said valve from said one side and defining an effective area on said opposite side of said valve equal to said selected area on said one side of said valve and including fluid flow conduit means with spaced orifices therein and with the area therebetween communicating with said control pressure chamber, means to pass fluid at said first pressure through said conduit means to establish a reference pressure between said orifices and in said control pressure chamber which is a function of said first pressure, means to balance all other pressures acting on said valve, the area of said orifices being selected so that the ratio between said first and second pressures is a selected value.

2. Apparatus to control the pressure ratio between a first and second pressurized compartments in a flight vehicle comprising first conduit means connecting said first pressurized compartment to a lower pressure region and having an upstream and a downstream orifice therein so that the flow of fluid from said first compartment to said lower pressure region therethrough establishes a reference pressure therebetween which bears the same relation to said first compartment pressure as the area of said downstream orifice bears to the area of said upstream orifice, second conduit means connecting said second pressurized compartment to said lower pressure region and including piston type valving therein positionable to regulate flow therethrough and subjected over a selected area on one side to pressure from said second compartment, third conduit means including a servo sensor of the bellows type attached directly to the other side of said piston type valving and registering therewith over an area equal to said one side selected area, said third conduit means connecting the other side of said piston type valving to said first conduit means between said orifices so that said other side of said piston type valve is subjected to said reference pressure, means to balance all other pressures acting on said piston type valving so that said piston type valve is in equilibrium when the ratio between the pressure in said first and second compartments equals the ratio between the areas of said upstream and downstream orifices.

3. Apparatus according to claim 2 wherein said second compartment pressure acts on said one side of said piston type valve to open said valve and hence reduce second compartment pressure.

4. Apparatus according to claim 2 including a housing having two aligned valve seats therein, each positioned between said second conduit means and said second compartment, and wherein said piston type valve includes two joined pistons registerable with said valve seats to regulate flow between said second compartment and said second conduit means, and wherein said third conduit means includes concentric bellows connected directly to one of said pistons to receive said reference pressure therebetween and grounded against said housing.

5. Apparatus according to claim 2 and including a second piston type valve connected to said first, second and third conduits and being identical in detail with said first mentioned piston type valve.

6. Apparatus according to claim 2 including maximum and minimum area stops for said piston type valve.

References Cited by the Examiner
UNITED STATES PATENTS

| | | | |
|---|---|---|---|
| 1,206,532 | 11/16 | Gray | 137—625.34 XR |
| 1,787,686 | 1/31 | Kerr | 137—501 |
| 2,645,240 | 7/53 | Drake | 137—100 |
| 2,973,621 | 3/61 | Price | 60—35.6 |
| 2,982,293 | 5/61 | Dillon | 137—82 |
| 2,990,847 | 7/61 | Absalom | 137—501 XR |

M. CARY NELSON, *Primary Examiner.*

MARTIN P. SCHWADRON, *Examiner.*